US012234981B2

(12) United States Patent
Tang et al.

(10) Patent No.: US 12,234,981 B2
(45) Date of Patent: Feb. 25, 2025

(54) DEVICE FOR FORMING LIGHT STRIP INSTALLATION PATTERN AND METHOD FOR INSTALLING LIGHT STRIP

(71) Applicant: SAVANT TECHNOLOGIES LLC, East Cleveland, OH (US)

(72) Inventors: Fangru Tang, Shanghai (CN); Xin Qian, Shanghai (CN); Aijun Wang, Shanghai (CN); Zhiyong Wang, Shanghai (CN); Hongbin Xu, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

(21) Appl. No.: 18/528,312

(22) Filed: Dec. 4, 2023

(65) Prior Publication Data

US 2024/0240772 A1 Jul. 18, 2024

(30) Foreign Application Priority Data

Jan. 16, 2023 (CN) ......................... 202310071231.0

(51) Int. Cl.

| | |
|---|---|
| ***F21V 3/02*** | (2006.01) |
| ***F21S 4/20*** | (2016.01) |
| ***F21V 3/06*** | (2018.01) |
| *F21V 33/00* | (2006.01) |

(52) U.S. Cl.
CPC .................. *F21V 3/02* (2013.01); *F21S 4/20* (2016.01); *F21V 3/06* (2018.02); *F21V 33/0052* (2013.01)

(58) Field of Classification Search
CPC .......... F21V 3/02; F21V 3/06; F21V 33/0052; F21S 4/20; F21Y 2115/10
See application file for complete search history.

(56) References Cited

U.S. PATENT DOCUMENTS

| | | | |
|---|---|---|---|
| 8,046,941 | B2 | 11/2011 | Schnuckle |
| 8,749,621 | B2 | 6/2014 | Joseph et al. |

FOREIGN PATENT DOCUMENTS

| | | |
|---|---|---|
| CN | 204256367 U | 4/2015 |
| CN | 211606565 U | 9/2020 |

*Primary Examiner* — Elmito Breval

(57) ABSTRACT

Provided is a device for forming a light strip installation pattern and a method for installation thereof. The device includes a pattern forming member capable of forming a predetermined pattern; and a pattern bearing portion having an object surface, a first pattern the same as the predetermined pattern can be formed on the object surface by using the predetermined pattern and when the device is used, the first pattern on the object surface is irradiated by a light source and is imaged on a predetermined installation surface to form a second pattern, and the light strip can be installed on the predetermined installation surface along the second pattern.

20 Claims, 6 Drawing Sheets

(A)

(B)

DEVICE FOR FORMING LIGHT STRIP INSTALLATION PATTERN AND METHOD FOR INSTALLING LIGHT STRIP

CROSS-REFERENCE TO RELATED APPLICATIONS

This application claims the benefit of Chinese Patent Application Serial Number 202310071231.0, filed Jan. 16, 2023, which is incorporated herein by reference.

FIELD OF TECHNOLOGY

The present disclosure relates to the field of light strips. In particular, the present disclosure relates to a device for forming a light strip installation pattern and a method for installing a light strip.

BACKGROUND

The light strip can be used for decoration, illumination, etc., and can provide a pleasant atmosphere to various festival activities. By configuring a light strip into a desired pattern, text, etc., a specific light-emitting pattern and a light-emitting effect can be formed, thereby achieving the purpose of heightening different atmospheres or providing illumination.

In the prior art, in order to construct a desired pattern with a light strip at a predetermined position, it is necessary to outline a general shape of the desired pattern at the predetermined position by using a masking tape, and then paste the light strip along the trace of the pattern outlined by the masking tape, thereby constructing the desired pattern by using the light strip, and forming a specific light-emitting pattern and a light-emitting effect.

However, in this process, it takes a long time to outline the shape of the desired pattern, and before the final shape of the desired pattern is outlined with the masking tape, the total length of the trace of the pattern cannot be determined, as a result, the length of the light strip provided by the user is generally longer or shorter than the total length of the trace of the delineated pattern, that is, the length of the light strip does not match the total length of the trace of the outlined pattern, causing the problem of a waste or insufficiency of the light strip. In addition, when it is found that there is a deviation between the pasting position and the expected position of the masking tape, the masking tape needs to be removed and re-pasted, and there is a problem of repeated rework.

Although a preset pattern template may be provided by using a CAD tool in the prior art, during usage, by pasting the preset pattern template at a predetermined position, a desired pattern having a trace of a predetermined length may be obtained according to an indication on the preset pattern template. However, the patterns provided by the described method are limited in style, and it is possible that these patterns are not patterns desired by the user, and in general, the user desires to design the patterns on his own.

In view of this, it is desirable to provide a device for forming a light strip installation pattern and a method for installing a light strip, which can quickly and flexibly form a light strip installation pattern, and provide a light strip installation pattern in which a trace length exactly matches a light strip length, so as to solve the described technical problems.

SUMMARY

The purpose of the present disclosure is to provide a device for forming a light strip installation pattern and a method for installing a light strip, which can quickly and flexibly form a light strip installation pattern and provide a light strip installation pattern in which a trace length exactly matches the length of the light strip, thereby saving the time for forming the light strip installation pattern and avoiding waste or insufficiency of the light strip.

According to an embodiment of the present disclosure, provided is a device for forming a light strip installation pattern comprising: a pattern forming member, having a predetermined length and configured to be capable of forming a predetermined pattern; and a pattern bearing portion having a light-transmitting object surface, wherein a first pattern which is the same as the predetermined pattern can be formed on the object surface by using the predetermined pattern formed by the pattern forming member; wherein when the device for forming a light strip installation pattern is used, the predetermined pattern is formed using the pattern forming member, the first pattern is formed on the object surface by using the predetermined pattern, the first pattern on the object surface is irradiated by a light source, the first pattern is imaged on a predetermined installation surface to form a second pattern, and the light strip can be installed on the predetermined installation surface along the second pattern.

By means of the described method, a user can form a predetermined pattern of any desired shape by using a pattern forming member, and the predetermined pattern desired by the user is formed on a suitable installation surface by means of imaging, so that a light strip installation pattern can be quickly and flexibly formed on the installation surface, thereby saving the time for forming the light strip installation pattern and installing the light strip.

In the device for forming a light strip installation pattern according to an embodiment of the present disclosure, the pattern forming member includes a flexible member capable of forming a predetermined pattern by bending.

By means of the described method, a specific form of the pattern forming member is provided. By the flexible member, the user can easily form a desired predetermined pattern by bending the flexible member.

In the device for forming a light strip installation pattern according to an embodiment of the present disclosure, the flexible member is elongated metal.

By means of the described method, a particular form of flexible member is provided.

In a device for forming a light strip installation pattern according to an embodiment of the present disclosure, the pattern bearing portion comprises a tubular unit which has a light-transmitting bottom and a side wall extending from the bottom to form a tubular structure, wherein the tubular unit has an opening at the end opposite to the bottom, and the bottom serves as the object surface.

By setting the bottom of the tubular unit to be light-transmitting, the light emitted from the light source can transmit through the light-transmitting portion of the bottom of the tubular unit, without transmitting through the first pattern at the bottom of the tubular unit, thereby performing imaging clearly on a predetermined installation surface, so as to form a second pattern corresponding to the first pattern.

The device for forming a light strip installation pattern according to an embodiment of the present disclosure further comprises: a support unit, including a tubular unit supporting portion configured to support the tubular unit.

By providing the support unit, the tubular unit can be fixed, thereby making the operation of the device for forming a light strip installation pattern more convenient.

In the device for forming a light strip installation pattern according to an embodiment of the present disclosure, when the device for forming a light strip installation pattern is used, the first pattern is formed at the bottom of the tubular unit by using the predetermined pattern; the tubular unit, on which the first pattern is formed at the bottom, is supported on the tubular unit supporting portion; the bottom of the tubular unit is irradiated with the light source from an opening of the tubular unit, thereby forming the second pattern on a predetermined installation surface which is at a predetermined distance from the light source, wherein the predetermined distance is related to the length of the light strip, the predetermined length, and the distance from the light source to the bottom.

By means of the described method, a specific method for generating a light strip installation pattern by using a tubular unit as a pattern bearing portion is provided. A light strip installation pattern in which the trace length exactly matches the length of the light strip can be provided by allowing the predetermined distance between the light source and the predetermined installation surface to be related to the length of the light strip, the predetermined length of the pattern forming member, and the distance between the light source and the bottom of the tubular unit, avoiding waste or insufficiency of the light strip.

In the device for forming a light strip installation pattern according to an embodiment of the present disclosure, the tubular unit comprises a cup of which the bottom is light-transmitting and the cup wall is not non-light-transmitting.

By means of the described method, a specific setting form of the tubular unit is provided. By making the bottom of the tubular unit be light-transmitting and the cup wall be not light transmitting, the contrast of the pattern and the surrounding environment can be enhanced, so that the second pattern formed on the predetermined installation surface is clearer.

In the device for forming a light strip installation pattern according to an embodiment of the present disclosure, the tubular unit is integrally formed with the tubular unit supporting portion.

By means of the described method, a forming method for a tubular unit and a support portion is provided.

In the device for forming a light strip installation pattern according to an embodiment of the present disclosure, the tubular unit supporting portion has a first side portion and a second side portion, and a connecting portion connecting the first side portion and the second side portion, when the tubular unit is supported, the bottom of the tubular unit is supported at the first side portion, and the end of the tubular unit having the opening is supported at the second side portion.

By means of the described method, a specific structure of the tubular unit supporting portion and a specific support form for the tubular unit are provided.

The device for forming a light strip installation pattern according to an embodiment of the present disclosure further comprises: a light source configured to irradiate the first pattern at the bottom, to form the second pattern.

A first pattern is irradiated with a light source to be imaged on a predetermined installation surface, so as to form a second pattern serving as a light strip installation pattern.

In the device for forming a light strip installation pattern according to an embodiment of the present disclosure, the support unit further includes a light source supporting portion configured to be capable of supporting the light source such that the light emitted from the light source is directed to the first pattern on the bottom through the tubular structure of the tubular unit.

By providing the light source supporting portion, the operation of the light source can be facilitated.

In the device for forming a light strip installation pattern according to an embodiment of the present disclosure, the light source is provided by a mobile device including a built-in torch function, and the light source supporting portion is configured to be capable of supporting the mobile device.

By means of the described method, a specific form of the light source is provided. The light source is provided by a common mobile device, so that the formation of a light strip installation pattern is more convenient, and the accessory cost of a device for forming a light strip installation pattern is reduced.

In the device for forming a light strip installation pattern according to the embodiment of the present disclosure, assuming that the distance from the light source to the bottom is d, the predetermined distance is D, the predetermined length is 1, and the length of the light strip is L, the described parameters satisfy the following relational expression: $d/D=1/L$.

The described method provides the specific relational expression for the predetermined distance between the light source and the predetermined installation surface and the length of the light strip, the predetermined length of the pattern forming member, and the distance between the light source and the bottom of the tubular unit, and according to the relational expression, a light strip installation pattern in which the trace length exactly matches the length of the light strip can be acquired, avoiding waste or insufficiency of the light strip.

In the device for forming a light strip installation pattern according to an embodiment of the present disclosure, the ratio of the predetermined length l to the length L of the light strip is 1:10 to 1:20.

By means of the described method, a specific proportional relationship between the predetermined length of the pattern forming member and the length of the light strip is provided. The range of the proportional relationship is selected so that the predetermined length of the pattern forming member is reasonable, and thus it neither takes up space due to too long light strip nor leads the predetermined pattern desired by the user cannot to be formed due to too short light strip, and can match the length of the major of light strips on the market.

According to another embodiment of the present disclosure, a method is provided for installing a light strip, comprising: forming a predetermined pattern using a pattern forming member having a predetermined length; using the predetermined pattern to form, on a light-transmitting object surface of a pattern bearing portion, a first pattern which is the same as the predetermined pattern; irradiating the first pattern on the object surface with a light source such that the first pattern is imaged on a predetermined installation surface to form a second pattern; and installing a light strip on the predetermined installation surface along the second pattern.

By means of the described method, a user can form a predetermined pattern of any desired shape by using a pattern forming member, and the predetermined pattern desired by the user is formed on a suitable installation surface by means of imaging, so that a light strip installation pattern can be quickly and flexibly formed on the installation surface, thereby saving the time for forming the light strip installation pattern.

In the method for installing a light strip according to another embodiment of the present disclosure, the pattern forming member comprises a flexible member, wherein a predetermined pattern is formed by bending the flexible member.

By means of the described method, a specific form of the patterned member is provided. By the flexible member, the user can easily form a desired predetermined pattern by bending the flexible member.

In the method for installing a light strip according to another embodiment of the present disclosure, the pattern bearing portion comprises a tubular unit which has a light-transmitting bottom and a side wall extending from the bottom to form a tubular structure, wherein the tubular unit has an opening at the end opposite to the bottom, and the bottom serves as the object surface.

By setting the bottom of the tubular unit to be light-transmitting, light emitted from the light source can transmit through the light-transmitting portion of the bottom of the tubular unit, without transmitting through the first pattern which is not light-transmitting at the bottom of the tubular unit, thereby performing imaging clearly on a predetermined installation surface, so as to form a second pattern corresponding to the first pattern.

In the method for installing a light strip according to another embodiment of the present disclosure, using the predetermined pattern to form, on an object surface of a pattern bearing portion, a first pattern which is the same as the predetermined pattern comprises: sketching (e.g., with a pen), the predetermined pattern on the bottom of the tubular unit along the trajectory of the predetermined pattern, to form the first pattern.

By means of the described method, a specific method for forming a first pattern is provided.

In the method for installing a light strip according to another embodiment of the present disclosure, irradiating the first pattern on the object surface with a light source such that the first pattern is imaged on a predetermined installation surface to form a second pattern comprises: irradiating the bottom of the tubular unit with a light source from the opening of the tubular unit, thereby forming the second pattern corresponding to the first pattern on a predetermined installation surface which is at a predetermined distance from the light source, wherein the predetermined distance is related to the length of the light strip, the predetermined length, and the distance from the light source to the bottom.

By means of the method above, a specific method for generating a light strip installation pattern by using a tubular unit as a pattern bearing portion is provided. A light strip installation pattern in which the trace length exactly matches the length of the light strip can be provided by allowing the predetermined distance between the light source and the predetermined installation surface to be related to the length of the light strip, the predetermined length of the pattern forming member, and the distance between the light source and the bottom of the tubular unit, avoiding waste or insufficiency of the light strip.

In the method for installing a light strip according to another embodiment of the present disclosure, assuming that the distance from the light source to the bottom is d, the predetermined distance is D, the predetermined length is 1, and the length of the light strip is L, the described parameters satisfy the following relational expression: $d/D=1/L$.

The described method provides the specific relational expression for the predetermined distance between the light source and the predetermined installation surface and the length of the light strip, the predetermined length of the pattern forming member, and the distance between the light source and the bottom of the tubular unit, and according to the relational expression, a light strip installation pattern in which the trace length exactly matches the length of the light strip can be acquired, avoiding waste or insufficiency of the light strip.

BRIEF DESCRIPTION OF THE DRAWINGS

The drawings illustrated herein are used for providing further understanding of the present disclosure and constitute a part of some embodiments of the present disclosure, and the illustrative embodiments of the present disclosure and illustrations thereof are used for explaining the present disclosure, rather than constitute inappropriate limitation on the present disclosure. In the drawings.

DETAILED DESCRIPTION OF THE EMBODIMENTS

In order to enable those skilled in the art to understand the solutions of some embodiments of the present disclosure better, hereinafter, the technical solutions in the embodiments of the present disclosure will be described clearly and thoroughly with reference to the accompanying drawings of embodiments of the present disclosure. Obviously, the embodiments as described are only some of the embodiments of the present disclosure, and are not all the embodiments. On the basis of the embodiments in the present disclosure, all other embodiments obtained by a person of ordinary skill in the art without inventive effort shall all belong to the scope of protection of the present disclosure.

Figure 1:
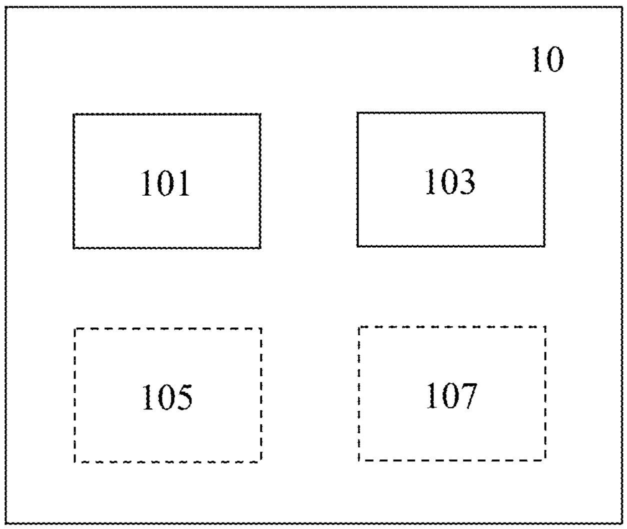
FIG. 1 shows a block diagram of a device for forming a light strip installation pattern according to an embodiment of the present disclosure.
Figure 2:
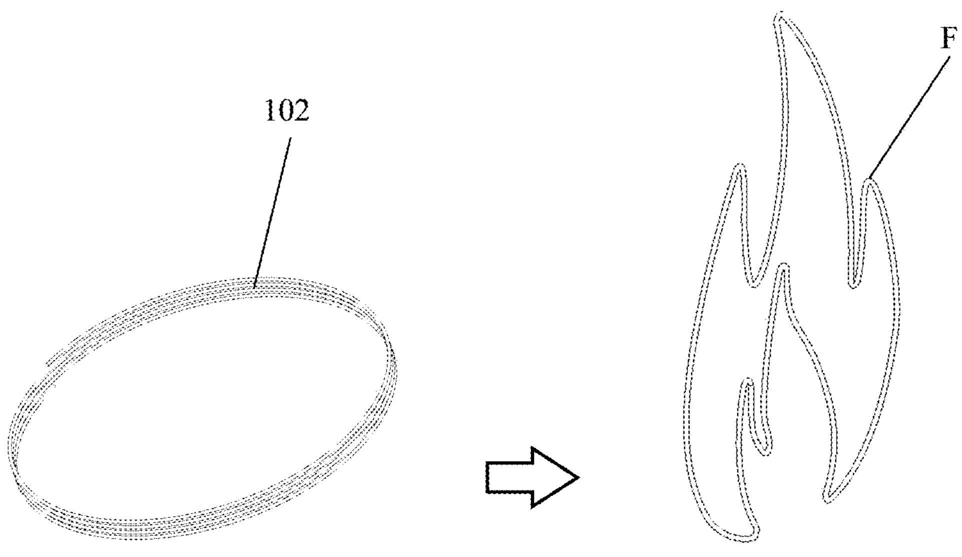
FIG. 2 shows an example in which the patterned member shown in FIG. 1 is a flexible member.
Figure 3:
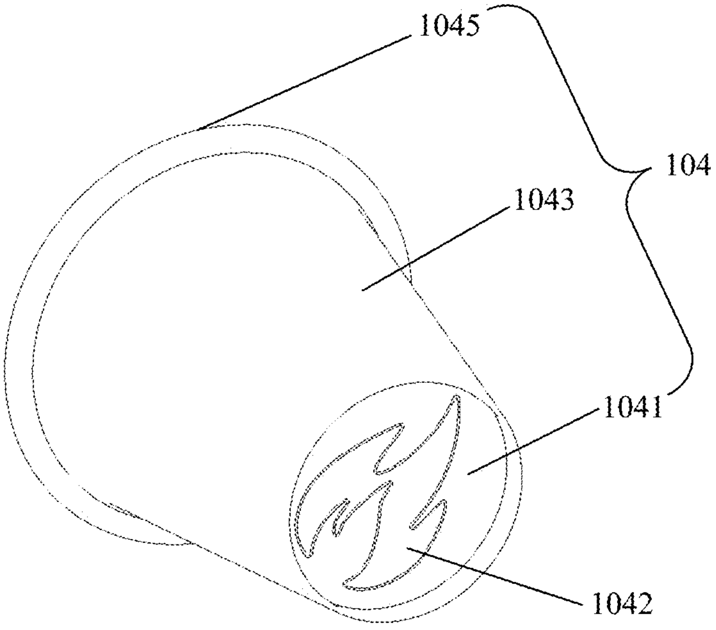
FIG. 3 shows an example in which the pattern bearing portion shown in FIG. 1 is a tubular unit.
Figure 4:
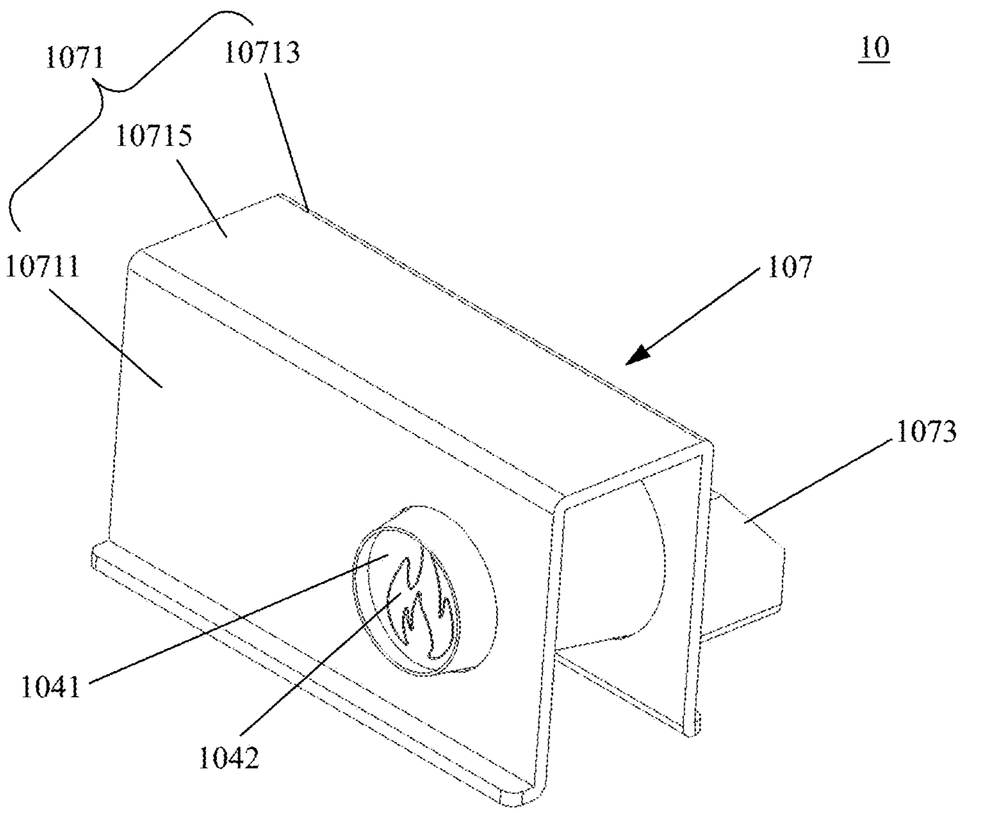
FIG. 4 shows an example of a device for forming a light strip installation pattern according to an embodiment of the present disclosure.
Figure 4:
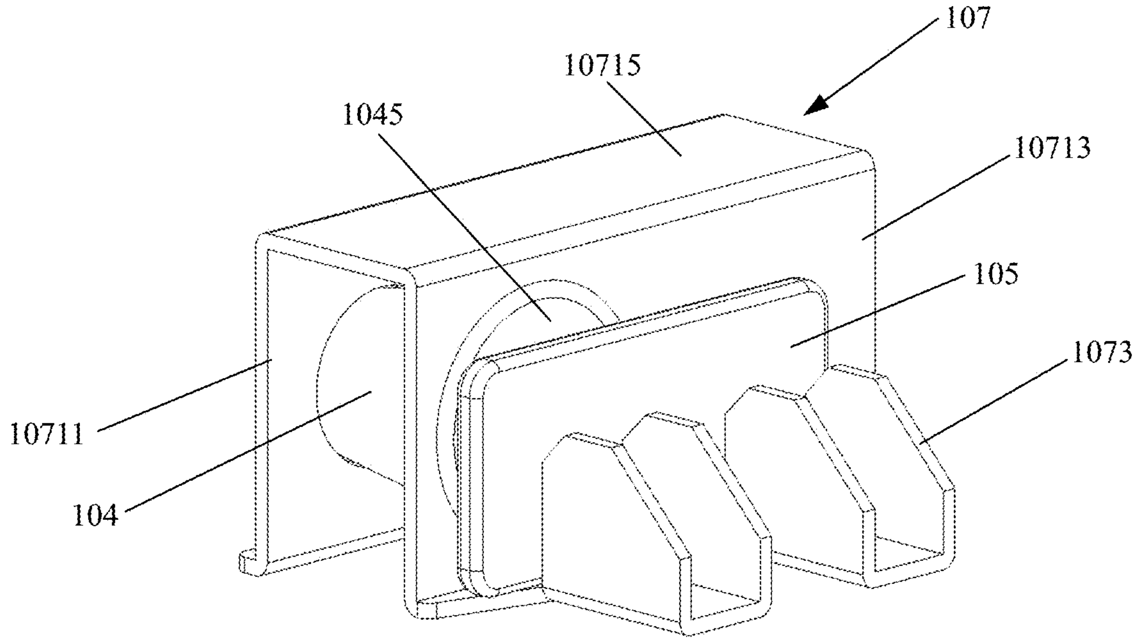
Figure 5:
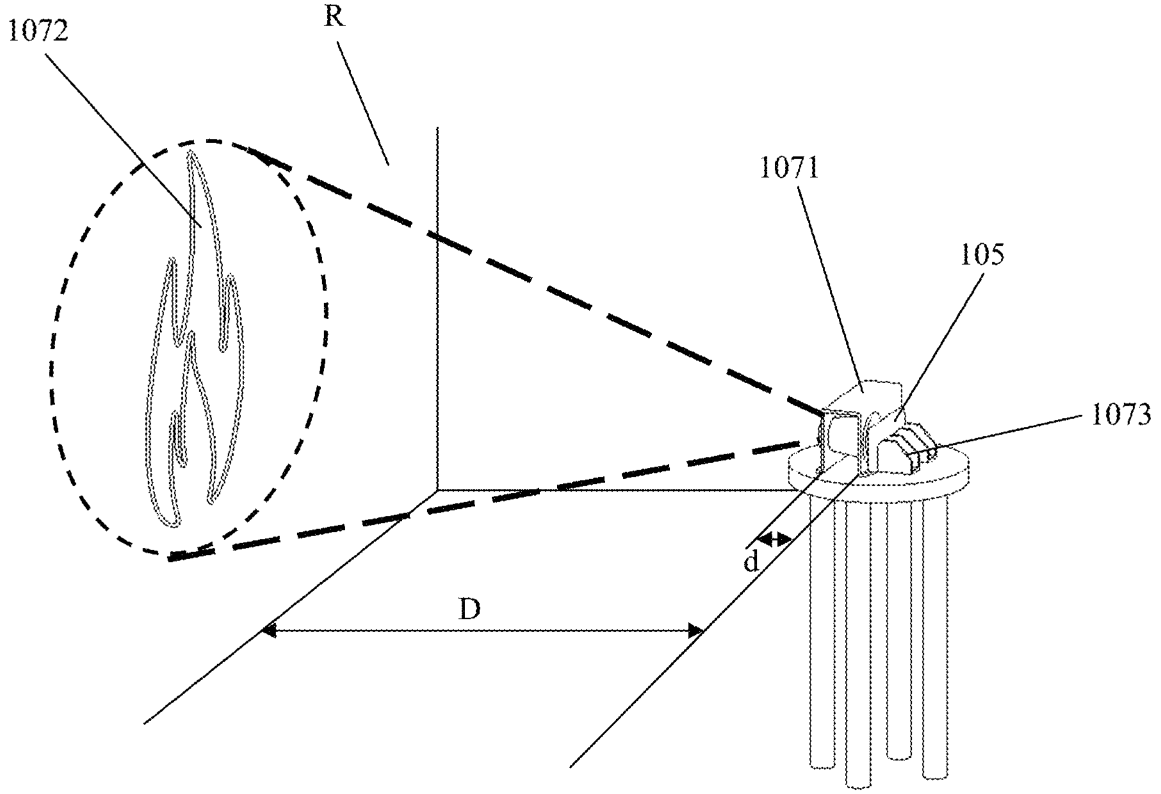
FIG. 5 shows an exemplary application of a device for forming a light strip installation pattern according to an embodiment of the present disclosure.

According to an embodiment of the present disclosure, a device for forming a light strip installation pattern is provided. FIG. 1 shows a block diagram of a device for forming a light strip installation pattern according to an embodiment of the present disclosure. FIG. 2 particularly shows an example in which the patterned member shown in FIG. 1 is a flexible member. FIG. 3 particularly shows an example in which the pattern bearing portion shown in FIG. 1 is a tubular unit. FIG. 4 shows a specific example of a device for forming a light strip installation pattern according to an embodiment of the present disclosure, wherein (A) and (B) show the device for forming a light strip installation pattern from different angles. FIG. 5 shows an application example of a device for forming a light strip installation pattern according to an embodiment of the present disclosure. A device for forming a light strip installation pattern according to an embodiment of the present disclosure will be described below with reference to FIGS. 1 to 5.

As shown in FIG. 1, a device for forming a light strip installation pattern 10 according to an embodiment of the present disclosure comprises a pattern forming member 101 and a pattern bearing portion 103. When the device for forming a light strip installation pattern 10 is used, the predetermined pattern is formed using the pattern forming member 101, the first pattern is formed on the pattern bearing portion 103 by using the predetermined pattern, the first pattern is irradiated by a light source, the first pattern is imaged on the predetermined installation surface to form a second pattern, and the light strip can be installed on the predetermined installation surface along the second pattern.

A pattern forming member 101 has a predetermined length and is configured to be capable of forming a predetermined pattern.

The pattern forming member 101 may comprise a flexible member 102 shown in FIG. 2, for example, the flexible member 102 may be elongated metal, such as an iron wire. The flexible member 102 can be bent to form a predetermined pattern, such as a flame pattern F.

The predetermined length of the patterned member 101 may be 10 to 30 cm, preferably 20 cm.

The pattern bearing portion 103 has a light-transmitting object surface, and a first pattern which is the same to a predetermined pattern, such as a flame pattern F, can be formed on the object surface by using the predetermined pattern formed by the pattern forming member 101.

For example, the pattern bearing portion 103 may comprise a tubular unit 104 as shown in FIG. 3, the tubular unit 104 has a light-transmitting bottom 1041 and a side wall 1043 extending from the bottom 1041 to form a tubular structure, wherein the tubular unit 104 has an opening 1045 at the end opposite to the bottom 1041, and the bottom 1041 serves as the object surface. On the bottom 1041, a first pattern 1042 which is the same as the predetermined pattern, for example, the flame pattern F, can be formed by the flexible member 102.

Specifically, the flame pattern F formed by bending the flexible member 102 is closely attached to the outer side of the bottom 1041 of the tubular unit 104, and a marker pen enters the tubular unit 104 through the opening 1045 of the tubular unit 104 to draw the first pattern 1042, which is exactly the same as the flame pattern F, on the inner side of the bottom 1041 along the trajectory of the flame pattern F.

Optionally, the flame pattern F may be closely attached to the inner side of the bottom 1041 of the tubular unit 104, and the first pattern 1042 may be drawn on the outer side of the bottom 1041 by a marker pen.

Optionally, the flame pattern F may be pasted inside or outside the bottom 1041 of the tubular unit 104 to serve as the first pattern 1042, without drawing the flame pattern F on the bottom 1041.

The method of forming the first pattern at the bottom of the tubular unit is not limited thereto, and any method capable of forming the first pattern at the bottom of the tubular unit is applicable to the present disclosure.

The bottom 1041 of the tubular unit 104 is light-transmitting. Preferably, the side wall 1043 of the tubular unit 104 is non-light-transmitting. For example, the tubular unit 104 may be a cup of which the bottom is light-transmitting, and the cup wall is non-light-transmitting.

FIG. 3 shows a case where the tubular unit 104 is a cup. However, the present disclosure is not limited thereto. The tubular unit 104 may be any tubular structure having a side wall and a light-transmitting bottom. The bottom may be circular or square, and may also include other shapes.

Optionally, as shown in FIG. 1, the device for forming a light strip installation pattern 10 may further comprise a light source 105. The light source 105 is configured to irradiate the first pattern 1042 at the bottom 1041 of the tubular unit 104 to form a second pattern.

The light source 105 is preferably a point light source. For example, the light source 105 may be provided by a mobile device including a built-in torch function, and the mobile device may be, for example, a smart phone, a tablet, etc. As shown in FIG. 4, the light source 105 is provided by a built-in torch of a mobile device, such as a smart phone. It should be noted here that, in the present disclosure, in order to prevent the present disclosure from being hard to understand due to excessive reference signs, while not affecting the understanding of the technical solution of the present disclosure, a mobile device such as a smart phone is designated as the light source 105 as a whole.

Optionally, as shown in FIG. 1, the device for forming a light strip installation pattern 10 may further comprise a support unit 107.

As shown in FIG. 4, the support unit 107 may comprise a tubular unit supporting portion 1071 and a light source supporting portion 1073. The tubular unit supporting portion 1071 is configured to be capable of supporting the tubular unit 104, and the light source supporting portion 1073 is configured to be capable of supporting the light source 105, that is, capable of supporting a mobile device such as a smart phone.

The tubular unit supporting portion 1071 has a first side portion 10711 and a second side portion 10713, and a connecting portion 10715 connecting the first side portion 10711 and the second side portion 10713, when the tubular unit 104 is supported, the bottom 1041 of the tubular unit 104 is supported at the first side portion 10711, and the end of the tubular unit 104 having the opening 1045 is supported at the second side portion 10713.

The tubular unit 104 and the tubular unit supporting portion 1071 may be integrally formed or separately formed.

The light source supporting portion 1073 is provided at the outer side of the second side portion 10713 of the tubular unit supporting portion 1071, abuts against the light source 105 from the outer side of the second side portion 10713 so as to sandwich the light source 105 between the second side portion 10713 and the light source supporting portion 1073 to support the light source 105, such that light emitted from the light source 105 emits towards the first pattern 1042 at the bottom 1041 of the tubular unit 104 through the tubular structure of the tubular unit 104.

The tubular unit supporting portion 1071 and the light source supporting portion 1073 may be integrally formed.

As shown in FIG. 5, when the device for forming light strip installation pattern 10 is used, the pattern forming member 101 is bent into a flame pattern F, the flame pattern F is drawn on the bottom 1041 of the tubular unit 104 with a marker pen to form a first pattern 1042, a tubular unit 104, on which the first pattern 1042 is formed at the bottom, is supported on a tubular unit supporting portion 1071; the light source 105 is supported on the light source supporting portion 1073; the bottom 1041 of the tubular unit 104 is irradiated with the light source 105 from an opening 1045 of the tubular unit 104, thereby forming the second pattern 1072 on a predetermined installation surface (e.g. wall surface) which is at a predetermined distance from the light source 105, wherein the predetermined distance is related to the length of the light strip, the predetermined length of the pattern forming member 101, and the distance from the light source 105 to the bottom 1041.

Specifically, assuming that the distance from the light source 105 to the bottom 1041 of the tubular unit 104 is d, the predetermined distance between the light source 105 and the predetermined installation surface R is D, the predetermined length of the pattern member 101 is l, and the length of the light strip is L, then the parameters satisfy the following relational expression:

$$d/D = l/L.$$

Preferably, the predetermined length l of the pattern forming member 101 and the length L of the light strip has a predetermined ratio, for example, 1:10 to 1:20.

For example, if it is known that the predetermined length l of the pattern forming member 101 is 20 cm, the distance d between the light source 105 and the bottom 1041 of the tubular unit 104 is 8 cm, if the length L of the light strip provided by the user is 3 meters, a second pattern 1072 having a total trace length of 3 meters should be formed on the installation surface R so as to enable the length of the light strip to exactly match the total trace length of the second pattern 1072, in this case, the distance D from the light source 105 to the predetermined installation surface R can be calculated as 1.2 meters by using the relational expression above. That is, the device for forming a light strip installation pattern 10 is placed at a position 1.2 meters away from the predetermined installation surface R, the height of the device for forming a light strip installation pattern 10 is adjusted by means of vertical movement, so that a second pattern 1072 with the total trace length of 3 meters can be formed at a suitable position on the predetermined installation surface R, a light strip of 3 meter is installed along the formed second pattern 1072, and thus a perfect second pattern 1072 can be exactly formed by the light strip, thereby avoiding the case of the light strip being too long or insufficient. Certainly, even if the foregoing relational expression is not satisfied, the implementation of the objectives of the present invention is not affected.

Thus, the length of the light strip exactly matches the length of the light strip installation pattern, thereby avoiding waste or insufficiency of the light strip.

Figure 6:
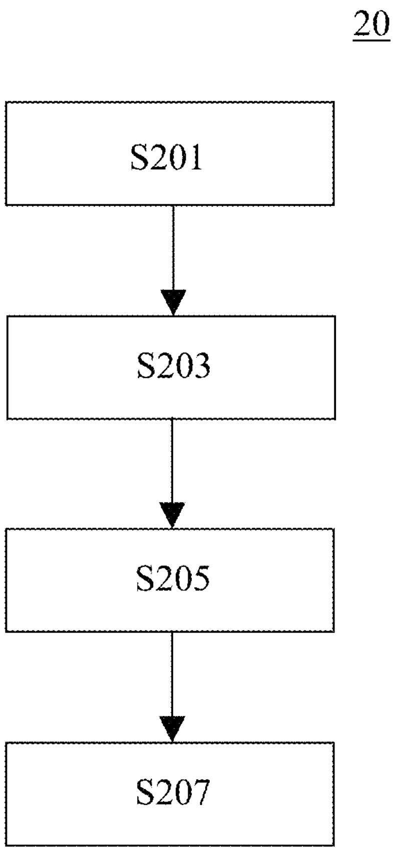
FIG. 6 shows a flowchart of a method for installing a light strip according to another embodiment of the present disclosure.

According to another embodiment of the present disclosure, a method for installing a light strip is provided. FIG. 6 shows a flowchart of a method for installing a light strip according to another embodiment of the present disclosure, and the method for installing a light strip according to another embodiment of the present disclosure will be described in detail below with reference to FIGS. 5 and 6.

It should be noted that, in the text above, the names, signs, functions, relations and the like of the respective components in the device for forming a light strip installation pattern and the usage of the device for forming a light strip installation pattern have been described in details, in the following description of the method for installing a light strip using the device for forming a light strip installation pattern, in order to prevent the present text from being hard to understand due to excessive description, the content described above will not be repeated, the following can be understood in conjunction with the related description for the device for forming a light strip installation pattern.

As shown in FIG. 6, the method for installing a light strip 20 according to another embodiment of the present disclosure includes the following steps (S201, S203, S205 and S207):

S201: forming a predetermined pattern using a pattern forming member having a predetermined length;

S203: using the predetermined pattern to form, on a light-transmitting object surface of a pattern bearing portion, a first pattern which is the same as the predetermined pattern;

S205: irradiating the first pattern on the object surface with a light source such that the first pattern is imaged on a predetermined installation surface to form a second pattern; and S207: installing a light strip on the predetermined installation surface along the second pattern.

Specifically, for example, in S201, a patterned member having a length of 20 cm is bent into a predetermined pattern, for example, a flame pattern F. In S203, the flame pattern F is drawn on the bottom 1041 of the tubular unit 104 with, for example, a marker pen, to form a first pattern 1042 exactly the same as the flame pattern F. Then, the tubular unit 104 with the first pattern 1042 formed at the bottom 1041 is supported on the tubular unit supporting portion 1071, and the light source 105 is supported on the light source supporting portion 1073. If the distance d between the light source 105 and the bottom 1041 of the tubular unit 104 is 8 cm, then a tool such as a flexible rule is used to measure the distance between the light source 105 and the predetermined installation surface R to be 1.2 m. In S205, the first pattern 1042 on the bottom 1041 of the tubular unit 104 is irradiated with the light source 105 from the opening 1045 of the tubular unit 104, the height of the device for forming a light strip installation pattern 10 is adjusted by means of vertical movement, so that a second pattern 1072 corresponding to the first pattern 1042 and having a total trace length of 3 meters can be formed at a suitable position on the predetermined installation surface R, and the second pattern 1072 may be drawn on the predetermined installation surface R using, for example, a pencil. In S207, a light strip of 3 meter is installed on the predetermined installation surface R along the second pattern 1072 drawn on the predetermined installation surface R.

By means of the described method, the length of the light strip exactly matches the length of the light strip installation pattern, thereby avoiding waste or insufficiency of the light strip.

The above exemplary embodiments have different emphases. Any missing details in one exemplary embodiment may be found in the related description of the other exemplary embodiments.

The description above only relates to preferred embodiments of the present disclosure. It should be noted that for a person with ordinary skill in the art, several improvements and modifications can also be made without departing from the technical principle of the present disclosure, and these improvements and modifications shall also be considered as within the scope of protection of the present disclosure.

The invention claimed is:

1. A device for forming a light strip installation pattern, comprising:

a pattern forming member having a predetermined length and configured to be capable of forming a predetermined pattern; and a pattern bearing portion having a light-transmitting object surface, wherein a first pattern which is the same as the predetermined pattern can be formed on the object surface by using the predetermined pattern formed by the pattern forming member;

wherein when the device for forming a light strip installation pattern is used, the predetermined pattern is formed using the pattern forming member, the first pattern is formed on the object surface by using the predetermined pattern, the first pattern on the object surface is irradiated with a light source, the first pattern is imaged on a predetermined installation surface to form a second pattern, and the light strip can be installed on the predetermined installation surface along the second pattern.

2. The device for forming a light strip installation pattern according to claim 1, wherein the pattern forming member comprises a flexible member capable of forming the predetermined pattern by bending.

3. The device for forming a light strip installation pattern according to claim 2, wherein the flexible member is elongated metal.

4. The device for forming a light strip installation pattern according to claim 1, wherein the pattern bearing portion comprises a tubular unit which has a bottom which is light-transmitting and a side wall extending from the bottom to form a tubular structure, wherein the tubular unit has an opening at the end opposite to the bottom, and the bottom serves as the object surface.

5. The device for forming a light strip installation pattern according to claim 4, further comprising:

a support unit, including a tubular unit supporting portion configured to support the tubular unit.

6. The device for forming a light strip installation pattern according to claim 5, wherein when the device for forming a light strip installation pattern is used, the first pattern is formed at the bottom of the tubular unit by using the predetermined pattern; a tubular unit, on which the first pattern is formed at the bottom, is supported on a tubular unit supporting portion;

the bottom of the tubular unit is irradiated with the light source from an opening of the tubular unit, thereby forming the second pattern on a predetermined installation surface which is at a predetermined distance from the light source, wherein the predetermined distance is related to the length of the light strip, the predetermined length, and the distance from the light source to the bottom.

7. The device for forming a light strip installation pattern according to claim 5, wherein the tubular unit and the tubular unit supporting portion are integrally formed.

8. The device for forming a light strip installation pattern according to claim 5, wherein the tubular unit supporting portion has a first side portion and a second side portion, and a connecting portion connecting the first side portion and the second side portion, when the tubular unit is supported, the bottom of the tubular unit is supported at the first side portion, and the end of the tubular unit having the opening is supported at the second side portion.

9. The device for forming a light strip installation pattern according to claim 8, further comprising:

the light source, configured to irradiate the first pattern at the bottom, of the tubular unit to form the second pattern.

10. The device for forming a light strip installation pattern according to claim 5, wherein the support unit further comprises a light source supporting portion configured to support the light source such that light emitted from the light source emits towards the first pattern at the bottom through the tubular structure of the tubular unit.

11. The device for forming a light strip installation pattern according to claim 10, wherein the light source is provided by a mobile device having a built-in torch function, and the light source supporting portion is configured to support the mobile device.

12. The device for forming a light strip installation pattern according to claim 6, wherein a distance between the light source and the bottom is d, a predetermined distance is D, a predetermined length is 1, and a length of the light strip is L, for the following relational expression:

$$d/D = 1/L.$$

13. The device for forming a light strip installation pattern according to claim 12, wherein a ratio of the predetermined length l to the length L of the light strip is 1:10 to 1:20.

14. The device for forming a light strip installation pattern according to claim 4, wherein the tubular unit comprises a cup of which a bottom thereof is light-transmitting and a cup wall thereof is non-light-transmitting.

15. A method for installing a light strip, comprising:

forming a predetermined pattern using a pattern forming member having a predetermined length;

using the predetermined pattern to form, on a light-transmitting object surface of a pattern bearing portion, a first pattern which is the same as the predetermined pattern;

irradiating the first pattern on the object surface with a light source such that the first pattern is imaged on a predetermined installation surface to form a second pattern; and installing a light strip on the predetermined installation surface along the second pattern.

16. The method for installing a light strip according to claim 15, wherein the pattern forming member comprises a flexible member, wherein the predetermined pattern is formed by bending the flexible member.

17. The method for installing a light strip according to claim 15, wherein the pattern bearing portion comprises a tubular unit which has a light-transmitting bottom and a side wall extending from the bottom to form a tubular structure, wherein the tubular unit has an opening at the end opposite to the bottom, and the bottom serves as the object surface.

18. The method for installing a light strip according to claim 17, wherein using the predetermined pattern to form, on an object surface of a pattern bearing portion, a first pattern which is the same as the predetermined pattern comprises:

sketching the predetermined pattern on the bottom of the tubular unit along the trajectory of the predetermined pattern, to form the first pattern.

19. The method for installing a light strip according to claim 17, wherein irradiating the first pattern on the object surface with a light source such that the first pattern is imaged on a predetermined installation surface to form a second pattern comprises: irradiating the bottom of the tubular unit with a light source from the opening of the tubular unit, thereby forming the second pattern corresponding to the first pattern on a predetermined installation surface which is at a predetermined distance from the light source, wherein the predetermined distance is related to the length of the light strip, the predetermined length, and the distance from the light source to the bottom.

20. The method for installing a light strip according to claim 19, wherein a distance between the light source and the bottom is d, a predetermined distance is D, a predetermined length is 1, and a length of the light strip is L, for the following relational expression:

$$d/D = 1/L.$$

* * * * *